United States Patent
Shepherd

(10) Patent No.: US 8,085,755 B2
(45) Date of Patent: Dec. 27, 2011

(54) DATA DRIVEN ROUTE ADVERTISEMENT

(75) Inventor: Gregory J. Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 712 days.

(21) Appl. No.: 11/095,736

(22) Filed: Apr. 1, 2005

(65) Prior Publication Data

US 2006/0221866 A1    Oct. 5, 2006

(51) Int. Cl.
*H04L 12/28* (2006.01)
(52) U.S. Cl. ......................................... 370/351
(58) Field of Classification Search .................. 370/238, 370/254, 255, 350, 351, 352, 389, 395.31, 370/395.32, 432; 709/238–242; 713/163
See application file for complete search history.

(56) References Cited

U.S. PATENT DOCUMENTS

| | | | |
|---|---|---|---|
| 6,314,105 B1 * | 11/2001 | Luong | 370/395.2 |
| 6,330,238 B1 * | 12/2001 | Ooe | 370/390 |
| 6,331,983 B1 * | 12/2001 | Haggerty et al. | 370/400 |
| 6,337,862 B1 * | 1/2002 | O'Callaghan et al. | 370/392 |
| 6,791,981 B1 * | 9/2004 | Novaes | 370/390 |
| 2002/0150094 A1 * | 10/2002 | Cheng et al. | 370/389 |
| 2003/0142670 A1 * | 7/2003 | Gould et al. | 370/390 |
| 2007/0243821 A1 * | 10/2007 | Hundscheidt et al. | 455/3.04 |

OTHER PUBLICATIONS

Anycast RP "Multicast Source Discovery Protocol Overview," Jun. 2001, pp. 1-6.

* cited by examiner

*Primary Examiner* — Yong Zhou
(74) *Attorney, Agent, or Firm* — Campbell Stephenson LLP

(57) ABSTRACT

Various methods and systems for performing data-driven route advertisement are disclosed. One method involves inhibiting advertisement of a route that is associated with a data source. Advertisement of the route is then allowed in response to detecting data sent by the data source. For example, advertisement of the route can be allowed in response to detecting that the data source is sending data at a rate that exceeds a user-specified data rate. The data source can be a multicast source that is identified by an anycast address.

17 Claims, 7 Drawing Sheets

DATA DRIVEN ROUTE ADVERTISEMENT

FIELD OF THE INVENTION

This invention relates to networking and, more particularly, to advertising routes within a network.

DESCRIPTION OF THE RELATED ART

Network routers are used to route packets from one network to another. Routers make routing decisions, which determine how packets should be forwarded, based on routing information. Routers use one or more routing protocols to communicate routing information to other routers. Such routing protocols include Routing Information Protocol (RIP), Interior Gateway Routing Protocol (IGRP), Enhanced IGRP (EIGRP), Open Shortest Path First (OSPF), Border Gateway Protocol (BGP), and the like.

Typically, each router stores routing information, which identifies routes to different network addresses, in a routing table. When a router is first powered on, the router can obtain information describing the routes to the devices that are directly connected to the router's interfaces (e.g., such routing information can be statically configured or dynamically obtained when the router's interfaces communicate with the directly-connected devices at power-up).

Routers obtain additional routing information by communicating with other routers. For example, when a router is powered on, the router's routing table can indicate routes to directly connected devices. The router can then receive a routing table update from a neighboring network device. The routing table update includes routing information contained in the neighboring network device's routing table. In response to the routing table update, the router can update its routing table to include the new routing information. The router can similarly send a routing table update to its neighboring devices.

The routing table updates that routers send to each other are referred to as routing advertisements. Typically, a router advertises all of the routes identified in its routing table upon startup. Additionally, a router can send routing advertisements whenever information in the router's routing table changes (e.g., due to addition of a new route to the routing table or removal of an existing route from the routing table) and/or periodically.

In certain situations, it may not be desirable for a router to advertise all of the routes in its routing table. For example, in many multicast applications, redundancy is provided by configuring several devices as sources of the same multicast stream. Thus, if one source fails, the multicast stream will still be available from another source. Problems may arise, however, if routes to all of the redundant sources are advertised. For example, if one of the sources fails but the route to that source is still being advertised, multicast join messages (used by subscribers who are trying to subscribe to the multicast stream) may still be routed to the failed source, even though other non-failed sources are available. Accordingly, techniques for allowing a router to selectively advertise routes are desirable.

BRIEF DESCRIPTION OF THE DRAWINGS

A more complete understanding of the present invention may be acquired by referring to the following description and the accompanying drawings, in which like reference numbers indicate like features.

Figure 1:
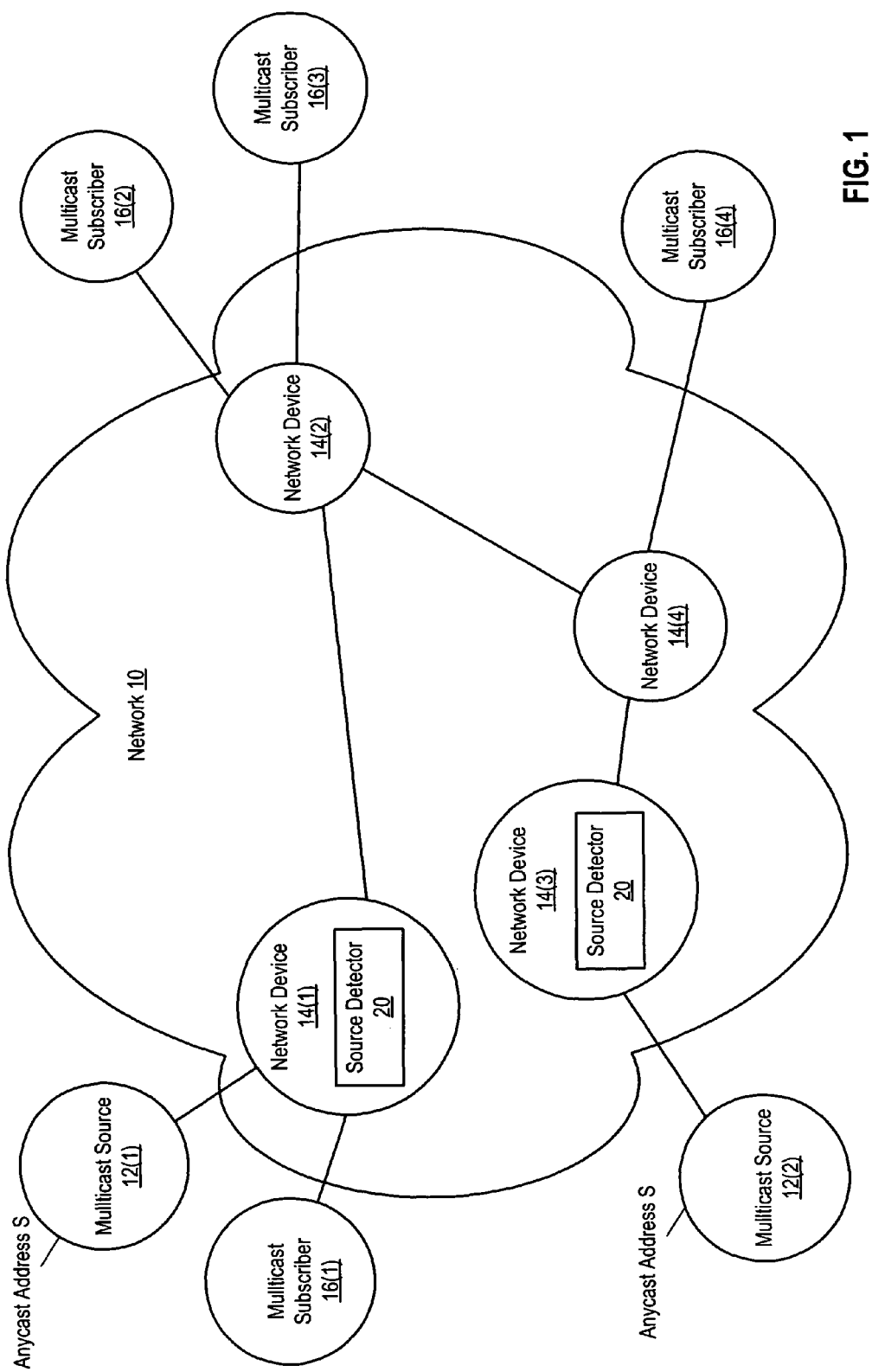
FIG. 1 illustrates a network including one or more routers that perform data driven route advertisement, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Various systems and method for performing data driven route advertisement are disclosed. A network device (e.g., a router) within a network is configured to control advertisement of a route associated with a particular data source based on whether the network device has detected any data generated by that data source. For example, if the network device has not detected any packets generated by the data source, the network device will not advertise a route to that data source; and if the network device has detected packets generated by that data source, the router will advertise the route to the data source. A user can specify thresholds (e.g., in terms of a number of packets or bytes) in order to provide additional control over when routes to such data sources are advertised.

Data driven route advertisements can be used to control the advertisement of routes to multiple data sources that use the same anycast address. For example, if each of several redundant sources for a multicast data stream share the same anycast address, data driven route advertisements can be used to control whether a route to a particular one of the redundant multicast sources will be advertised. It is noted that a data source can be a network device.

A route is a logical or physical communications pathway, or information describing such a pathway, via which packets can be sent to a particular device. For purposes of this disclosure, a "packet" may include a cell, datagram, frame, message, segment, or any other logical group of information that is conveyed via a network. Network devices perform switching and routing functions in order to convey packets from a source to a destination along a route.

FIG. 1 illustrates a network that includes routers configured to perform data driven route advertisement. In FIG. 1, a network 10 couples two redundant multicast sources 12(1) and 12(2) to several multicast subscribers 16(1)-16(4). Network 10 includes several network devices 14(1)-14(4). The two network devices 14(1) and 14(3) that are closest to multicast sources 12(1) and 12(2) each include a source detector 20, which enables network devices 14(1) and 14(3) to perform data driven route advertisement. It is noted that in other embodiments, other network devices can include source detectors 20 in addition to and/or instead of network devices closest to the multicast sources 12(1) and 12(2).

Network 10 is a network that interconnects multicast sources 12(1)-12(2) and multicast subscribers 16(1)-16(4). Network 10 can include one or more local area networks (LANs) and/or wide area networks (WANs). Network 10 can be implemented using any (or a combination) of a variety of different media, including wireless links, coaxial cables, fiber optic cables, and the like.

As shown in FIG. 1, multicast source 12(1) and multicast subscriber 16(1) are coupled to network device 14(1). Multicast source 12(2) is coupled to network device 14(3). Multicast subscribers 16(2) and 16(3) are coupled to network device 14(2). Multicast subscriber 16(4) is coupled to network device 14(4). Network device 14(1) is coupled to network device 14(2). Network device 14(2) is coupled to network device 14(4). Network device 14(4) is coupled to network device 14(3). It is noted that one device can be coupled to another device either directly by a physical link (as shown in FIG. 1) or indirectly by, for example, a logical tunnel or several physical links and intervening network devices.

Multicast sources 12(1) and 12(2) are configured to send duplicate data streams to the same multicast group address G. In this example, multicast sources 12(1) and 12(2) also use the same anycast source address, S, when sending packets. Multicast sources 12(1) and 12(2) are computing devices (e.g., host computer systems, personal digital assistants, cell phones, network appliances, network devices, and the like) that encode a data stream for transmission via network 10 and then send packets containing the encoded data stream to subscribers via network 10. For example, multicast sources 12(1) and 12(2) can be video head ends that receive the same video stream, prepare that video stream for transmission, and send packets that encode the video stream to subscribers via network 10.

Multicast subscribers 16(1)-16(4) are computing devices that subscribe to a multicast group G (e.g., by sending an Internet Group Management Protocol (IGMP) group report to a network device, which causes the network device to generate a multicast group join according to Protocol Independent Multicast (PIM) Source Specific Multicast (SSM) protocol). Multicast subscribers 16(1)-16(4) then receive a data stream addressed to multicast group G via network 10, decode the data stream, and present the decoded data stream to users (e.g., via a display device such as a monitor and/or an audio device such as a speaker). Multicast subscribers 16(1)-16(4) can be personal computers, personal digital assistants, cell phones, network appliances, set top boxes, and the like.

Network devices 14(1)-14(4) (collectively, network devices 14) include various network devices (e.g., routers and switches) that perform routing functions and support a routing protocol. Each network device 14(1)-14(4) maintains a routing table that stores routing information identifying routes to various data sources. Network devices 14(1)-14(4) use one or more routing protocols to share information in their routing tables with each other by routinely (i.e., in a routine manner, such as at periodic intervals or in response to predesignated stimuli) sending routing advertisements to each other.

Each source detector 20 is configured to detect whether a data source is sending data into network 10. For example, each source detector 20 can snoop packets entering a network device for packets having the data source's address as a source address (alternatively, source detector 20 can monitor a particular interface for incoming traffic, if the data source is the only device coupled to that interface). Each source detector 20 then controls whether a route to that data source will be advertised based on whether the data source is sending data. For example, source detector 20 in network device 14(1) can be configured to detect whether multicast source 12(1) is sending data into network 10. If source detector 20 determines that multicast source 12(1) is sourcing data, source detector 20 allows network device 14(1) to advertise a route to multicast source 12(1). Similarly, source detector 20 in network device 14(3) can be configured to detect whether multicast source 12(2) is sending data; if so, source detector 20 allows network device 14(3) to advertise the route leading to multicast source 12(2).

Network device 14(1) advertises a route to multicast source 12(1) by sending a routing advertisement to neighboring network devices. The routing advertisement is sent according to a routing protocol and includes information identifying the route that leads to multicast source 12(1). Routing advertisements contain information from the sending network device's routing table and are used to update another network device's routing table. A network device is advertising a route whenever that network device is sending routing advertisements that identify that route to other network devices. A network device is not advertising a route whenever the network device has information identifying the route stored in the network device's routing table, but the network device does not include that information in routing advertisements sent to other network devices.

Network devices send routing updates to neighboring network devices. In this example, network device 14(1) sends routing advertisements to network device 14(2). In response to receiving a routing advertisement that contains a route from network device 14(1), network device 14(2) can selectively update its routing table (dependent upon whether the route meets constraints specified in the routing protocol) to include the route and send another routing advertisement containing the route to its neighbor, network device 14(4). Network device 14(4) can then repeat the process performed by network device 14(2). Thus, once network device 14(1) begins advertising the route to multicast source 12(1), information identifying the route can be propagated throughout network 10, allowing network devices 14(2)-14(4) the opportunity to add the route to their routing tables.

Network devices 14(1)-14(4) use the routes in their routing tables to determine how to propagate packets. For example, when network device 14(4) is determining how to forward a packet addressed to anycast address S (i.e., a packet that has anycast destination address S as its destination address), network device 14(4) can search its routing table for a route leading to anycast address S and then forward the packet along the identified route. When a route is allowed to be advertised, it means that the network device on the edge of that route (i.e., closest to the destination of the route) will share information identifying that route with other network devices, thus allowing those network devices to use that route. Those devices can then in turn advertise the route to other network devices. For example, once network device 14(1) begins advertising the route to anycast address S (identifying multicast source 12(1) in this situation) that passes through network device 14(1), other network devices can add that route to their routing tables and begin forwarding packets along that route. Thus, by controlling when a route is advertised, source detector 20 can effectively control when that route is used to forward packets. This can be used to prevent packets (e.g., such as those used to join a multicast group) from being sent to a multicast source that is not currently sourcing data, even if that multicast source is the closest source for the multicast group. This prevents subscribers to the multicast group from being joined to a non-operational multicast source for the multicast group.

As noted above, multicast sources 12(1) and 12(2) are identified by the same network address S. This network address is referred to as an anycast address, since the same address is used by multiple different devices. Network devices 14(1)-14(4) within network 10 are unaware that address S identifies multiple different devices. Accordingly, network devices will handle multiple routes to network address S as if those routes were merely alternative routes to the same data source, even thought the routes may actually be routes to different data sources.

Whenever one of network devices 14(1)-14(4) receives a routing advertisement that specifies a route to network address S, the network device will use the routing protocol to determine whether to add that route to its routing table. Often, routing protocols limit the number of routes to the same network address in a routing table. For example, one routing protocol may specify that a routing table should include no more than one route to a given network address. Thus, if a network device already stores information identifying a route to that address in its routing table and a route advertisement identifying a new route to that address is received, the network device uses the routing protocol to determine whether the new route should be discarded or used to replace the existing route in the routing table.

Routing protocols typically operate so that a router will keep the most efficient route(s) in its routing table. The efficiency of a route can be determined based on one or more of the following factors, depending upon the routing protocol: length, cost, bandwidth, delay, load, and reliability. For example, if a routing protocol uses length as its sole criteria for evaluating route efficiency, and if length is measured in hops (e.g., the distance between network devices 14(1) and 14(2) is one hop, while the distance between network devices 14(1) and 14(3) is three hops), a network device can determine whether to replace an existing routing table route with a new route, obtained in a routing advertisement, by comparing the number of hops identified in each route. Thus, if network device 14(4) currently has a routing table entry for network address S that indicates that the route to network address S (where S identifies multicast source 12(2)) passes through network device 14(3) and the length of the route is two hops, and if network device 14(4) receives a routing advertisement from network device 14(2) identifying a new route to network address S (where S identifies multicast source 12(1)) that passes through network device 14(2) and is three hops in length, network device 14(4) can determine that the route that is already stored in its routing table is more efficient and will discard the new route. Thus, even though the routes being compared are actually routes to different devices, network device 14(4) will handle the comparison as if the routes were simply alternative routes to the same network device due to the use of anycast addresses. It is noted that even in embodiments where routing tables store multiple routes to the same network address, the routing protocol can dictate that the routes be utilized in order based on efficiency, such that the router will route packets via the most efficient path.

As further result of using anycast addresses to identify the redundant multicast sources and of allowing routes to each of the sources to be advertised at the same time, it is possible for a pair of subscribers to be joined to different sources at the same time for the same multicast stream. For example, network device 14(4) can store information indicating that the route passing through network device 14(3) is the most efficient path to network address S. Accordingly, when network device 14(3) generates a multicast group join message for multicast subscriber 16(4) (in response to receiving an IGMP group report from multicast subscriber 16(4) that identifies multicast group G) that is addressed to network address S, network device 14(3) will forward that message towards multicast source 12(2). At the same time, network device 14(2) can store information indicating that the most efficient path to network address S passes through network device 14(1). When network device 14(2) receives a multicast group join from multicast subscriber 16(3), network device 14(2) will forward the join message towards multicast source 12(1). As this example shows, multicast subscribers 16(3) and 16(4) can subscribe to different multicast sources at the same time. Despite being subscribed to different sources, however, the subscribers will receive the same multicast stream (assuming normal operation), since multicast sources 12(1) and 12(2) are providing the same multicast data stream.

In addition to controlling the advertisement of a route by a particular network device, source detector 20 can also control whether the network device uses a particular route. For example, if source detector 20 of network device 14(1) detects that multicast source 12(1) is not yet sending data, source detector 20 can prevent network device 14(1) from advertising the route and from using that route to send packets to anycast address S. If network device 14(3) has already begun advertising the route to multicast source 12(2), network device 14(1) can receive an advertisement identifying another route to anycast address S (which identifies multicast source 12(2) in this instance) from network device 14(2) (after advertisements have been sent from network device 14(3) to network device 14(4), and from network device 14(4) to network device 14(2)). Accordingly, network device 14(1) can store information identifying two routes that lead to anycast address S: one route (to multicast source 12(1)) that is local to network device 14(1) but that is not allowed to be advertised, and another route (to multicast source 12(2)) that passes through network device 14(2). If network device 14(1) needs to send a packet to anycast address S (e.g., because multicast subscriber wants to subscribe to multicast group G), network device 14(1) will not select the route that is not allowed to be advertised. Accordingly, network device 14(1) will select to forward the packet along the route that passes through network device 14(2). Thus, even though a shorter route to anycast address S exists, network device 14(1) will not use that route if source detector 20 has not yet enabled advertisement of that route.

It is noted that each multicast source 12(1) and 12(2) can source data in multiple channels. Each channel is identified by a source address S and group address G pair. Thus, FIG. 1 illustrates how multicast sources 12(1) and 12(2) can source a multicast stream in one channel, (S, G). Multicast sources 12(1) and 12(2) can also source multicast data in n other channels, e.g., (S, G1), (S, G2), ..., (S, Gn). Additionally, in some embodiments, multicast sources 12(1) and 12(2) can use a different anycast source address for each channel (e.g., each multicast source can provide data in channels (S1, G1), (S2, G2), ..., (Sn, Gn). Furthermore, multicast sources 12(1) and 12(2) can source data in different channels (e.g., multicast source 12(1) can provide data in channels A and B, while multicast source 12(2) provides data in channels A and C.

Where there are several channels available from the same source, each source detector 20 can be configured to detect data in each (S, G) channel. Furthermore, each network device can advertise routes on a channel-by-channel basis. For example, routes can be independently identified (e.g., by including both the source and group address in the routing table entry corresponding to each route) within each network device's routing table and, correspondingly, in the route advertisements sent by each network device. Accordingly, source detector 20 can control the advertisement of routes corresponding to each channel based on whether data has been detected in each channel. Thus, if source detector 20 in network device 14(1) detects that multicast source 12(1) is sourcing multicast data in channel (S, G1) but not in channel (S, G2), source detector 20 can allow network device 14(1) to send route advertisements for the (S, G1) channel but prohibit network device 14(1) from sending route advertisements for the (S, G2) channel.

As a result of differentiating between channels, each network device can use a different route to forward multicast join messages that are addressed to the anycast address S but that are subscribing to a different channel. For example, if multicast subscriber 16(4) wants to subscribe to two channels (S, G1) and (S, G2), and if network device 14(3) has advertised the route to anycast address S (identifying multicast source 12(2)) for channel (S, G1) but not for channel (S, G2), network device 14(4) can send a multicast join for channel (S, G1) to anycast address S along the route that passes through network device 14(3), while sending a multicast join for channel (S, G2) to anycast address S along the route that passes through network devices 14(2) and 14(1).

Figure 2:
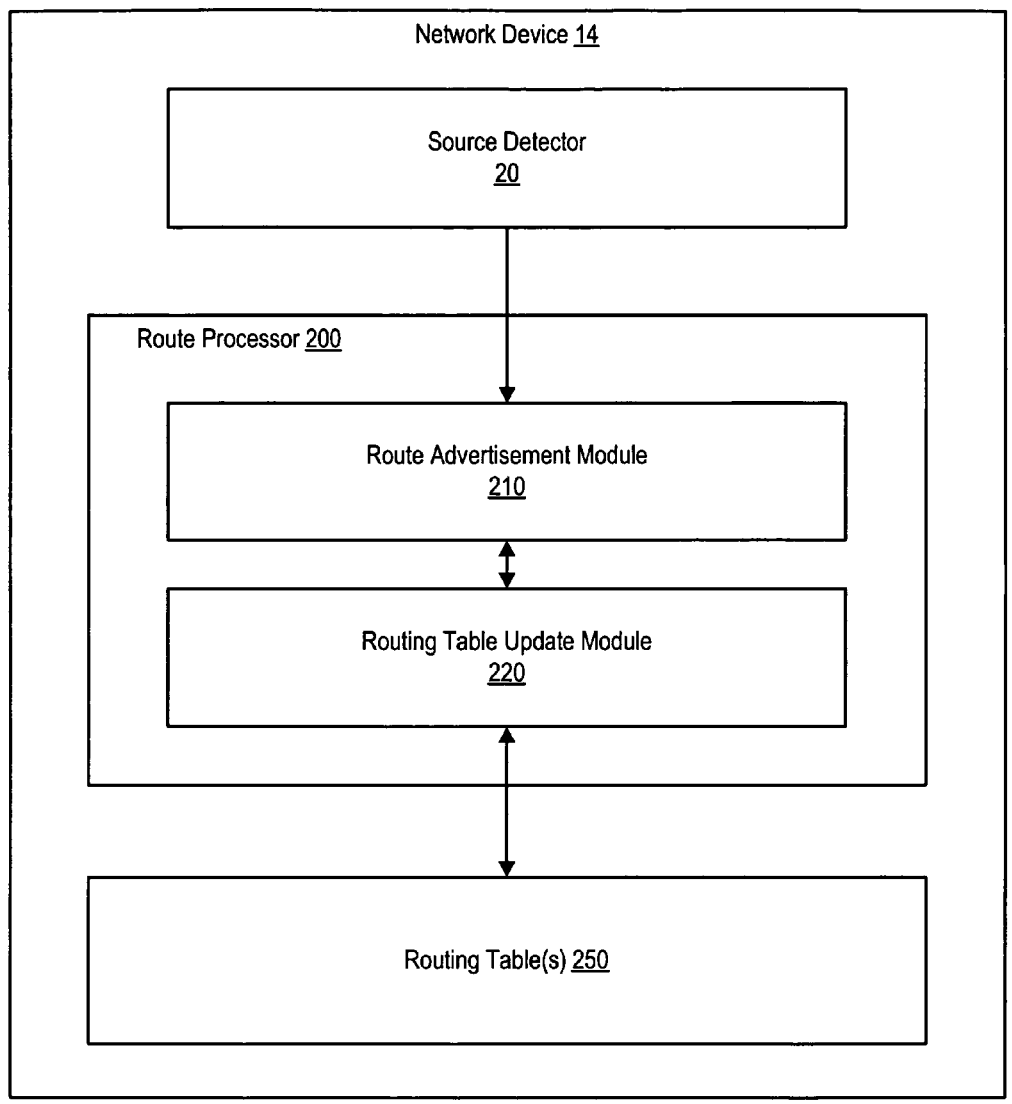
FIG. 2 is a block diagram of a network device that performs data driven route advertisement, according to one embodiment of the present invention.

FIG. 2 is a block diagram of a network device 14 (e.g., one of network devices 14(1)-14(4) of FIG. 1) that performs data driven route advertisement. As shown, network device 14 includes source detector 20, a route processor 200 that includes route advertisement module 210 and routing table update module 220, and one or more routing tables 250 (it is noted that routing tables are also sometimes referred to as forwarding databases).

Route processor 200 performs routing functionality for network device 14. Route advertisement module 210 is configured to handle route advertisements. Route advertisement module 210 generates and sends route advertisements based on updates to routing table(s) 250 as well as based on communications from source detector 20. Route advertisement module 210 also receives route advertisements from other network devices and passes information in those advertisements to routing table update module 220.

Routing table update module 220 is configured to maintain one or more routing tables 250. In some embodiments, a single routing table is maintained per network device. In other embodiments (e.g., in which network device participates in several different routing protocols), a separate routing table is maintained per routing protocol.

Routing table update module 220 maintains routing table(s) 250 by updating routing table(s) 250 in response to conditions such as the receipt of a routing advertisement. Routing table update module 220 can add routes to and remove routes from routing table(s) 250. Additionally, routing table update module 220 can replace existing routes within routing table(s) 250. Whenever routing table update module 220 updates a routing table, routing update module 220 can communicate the updated routing table (or the portion of the routing table that was updated) to route advertisement module 210, allowing route advertisement module 210 to send a route advertisement that includes the updated routing information.

Routing table(s) 250 store information identifying routes to various network addresses. Typically, a route is identified in terms of the next-hop device (e.g., by identifying the router interface leading towards the next-hop device) and one or more efficiency metrics.

As noted above, source detector 20 is configured to detect whether a particular data source is sending data. If the data source is sending data, source detector 20 notifies route advertisement module 210 that route advertisement module 210 can now advertise the route to the data source. In some embodiments, source detector 20 operates by detecting whether the data source is sending any data at all. For example, once a packet from the data source is detected, source detector 20 can enable route advertisement module 210 to advertise the route to the data source.

In other embodiments, source detector 20 uses one or more thresholds to determine whether the data source is sending an acceptable amount data. Network device 14 can include a user interface via which a network administrator can configured one or more thresholds for use by source detector 20. Thus, instead of simply detecting whether a particular data source is sending any data at all, source detector 20 can detect whether the data source is sending data at a rate that exceeds a user-specified threshold. In some embodiments, administrators can specify thresholds on a channel-by-channel basis.

User-specified thresholds can be specified in a variety of different ways, including a per-packet basis and a per-bit or -byte basis. A threshold identifies a number of units (e.g., packets or bytes) per unit time. For example, a threshold can be specified as 10 packets per second or 1024 Kbytes per second. A threshold can also include a duration components (e.g., 10 seconds). In one embodiment, if a duration is specified, source detector 20 can determine the average data rate at which the data source is sending data over the specified duration and then compare that value to the threshold. Alternatively, if a duration is specified, source detector 20 can simply monitor whether the data source is sending data at a rate that exceeds the threshold for the specified duration.

When the user-specified threshold specifies an actual data rate (as opposed to a packet rate), source detector 20 controls whether a route to the data source is advertised based on the size of the packets sent by that data source, as opposed to the mere presence or lack of packets sent by that data source. This can prevent a route to a source from being advertised if the source stops sending useful data but continues to send packets. For example, in a video distribution system, a video camera can be connected to a data source that is sending packets encapsulating the video produced by the video camera. If the video camera stops functioning properly and starts transmitting a blank video signal, the data source may be unaware that the camera has malfunctioned and continue to send packets encapsulating the blank video signal. The average size of packets encapsulating a blank video signal can be compared to the average size of packets that encapsulate non-blank video signals. Based on this comparison, a threshold can be selected that will allow advertisement of a route to a data source that is sending a typical non-blank video stream but that will stop advertisement of a route to a data source that is sending a blank video stream. In some situations, this can provide bandwidth savings by preventing bandwidth from being consumed by a blank video stream.

While source detector 20, routing processor 200, and routing table 250 are shown as separate modules, it is noted that these modules can be combined in other embodiments. For example, source detector 20 can be included as part of route processor 200 in some embodiments. Similarly, even though source detector 20, route advertisement module 210, and routing table update module 220 are shown as separate modules in FIG. 2, these modules can be combined into fewer modules (or even a single module) in other embodiments. Furthermore, it is noted that the functionality of each of the modules can be implemented in hardware, software, or a combination of hardware and software.

Figure 3:
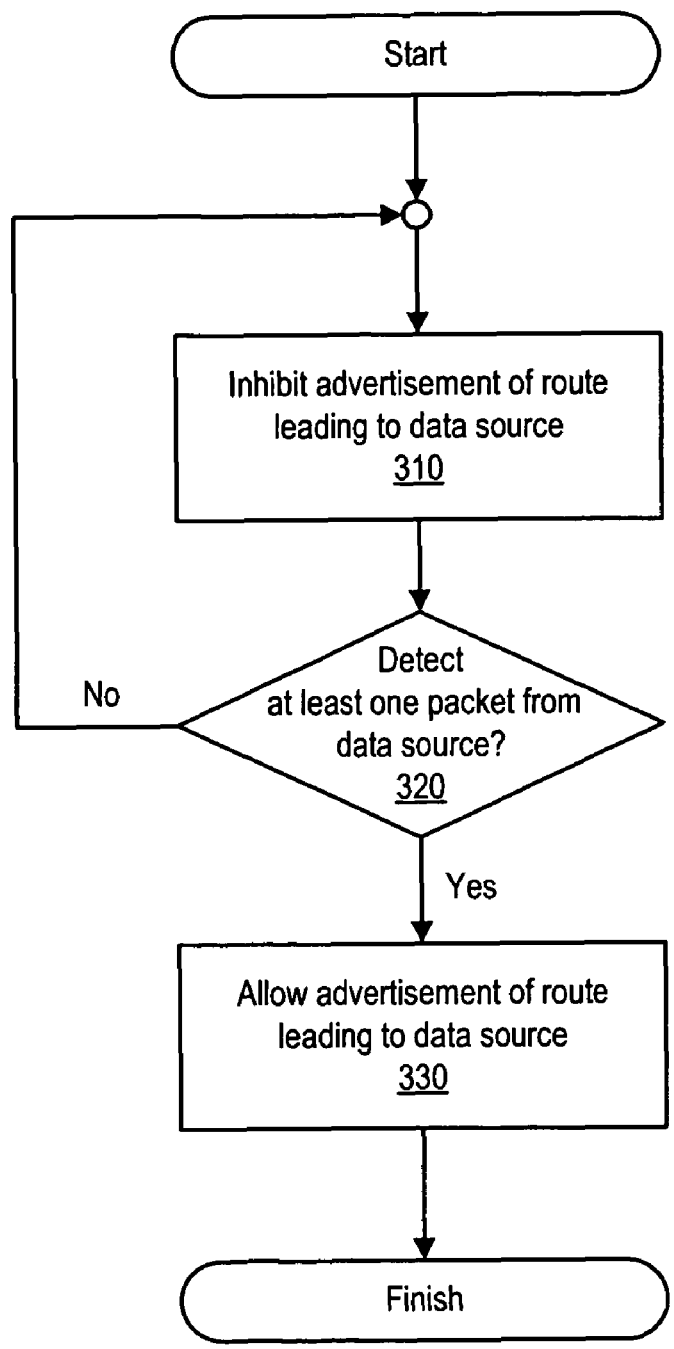
FIG. 3 is a flowchart of one embodiment of a method of performing data driven route advertisement.
Figure 4:
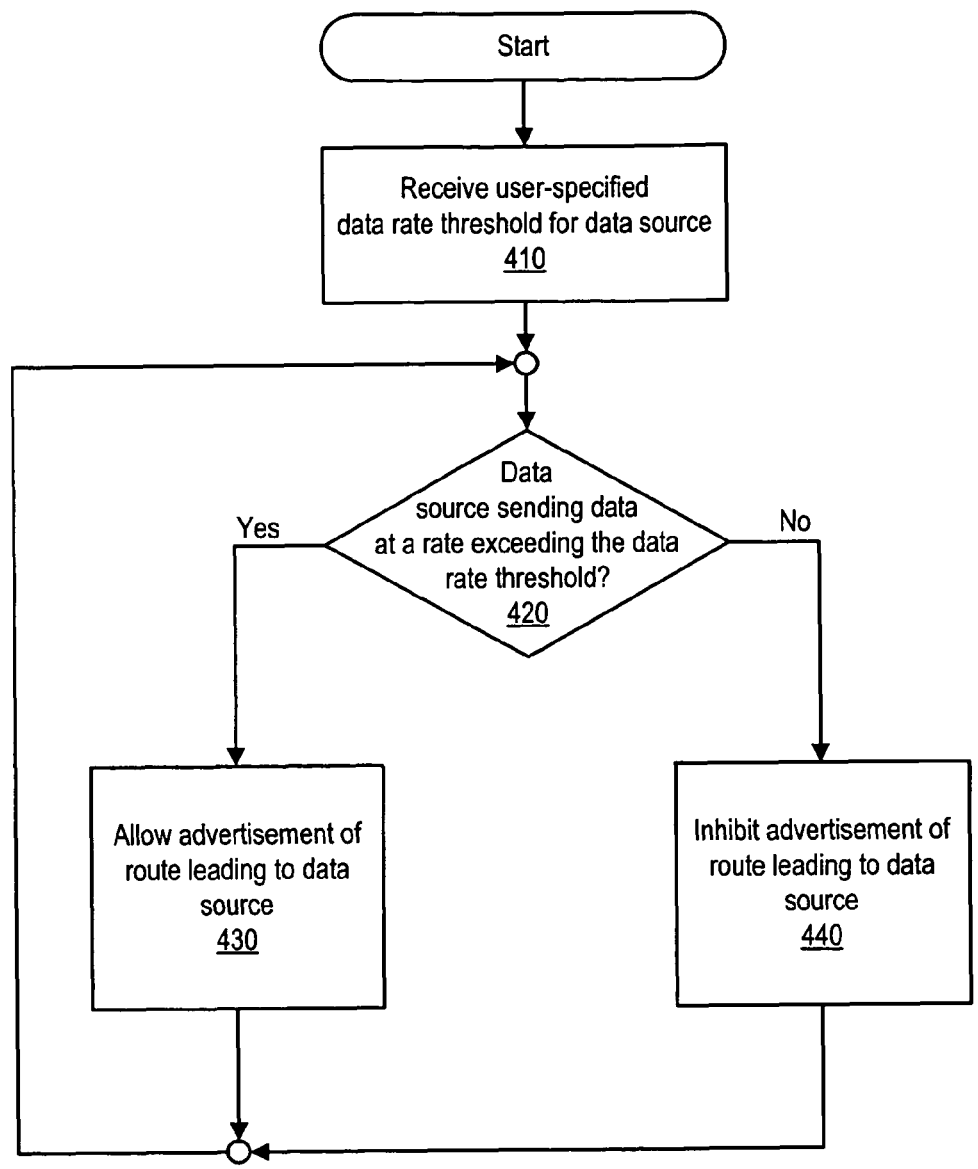
FIG. 4 is a flowchart of one embodiment of a method of performing data driven route advertisement based on a user-specified data rate threshold.
Figure 5:
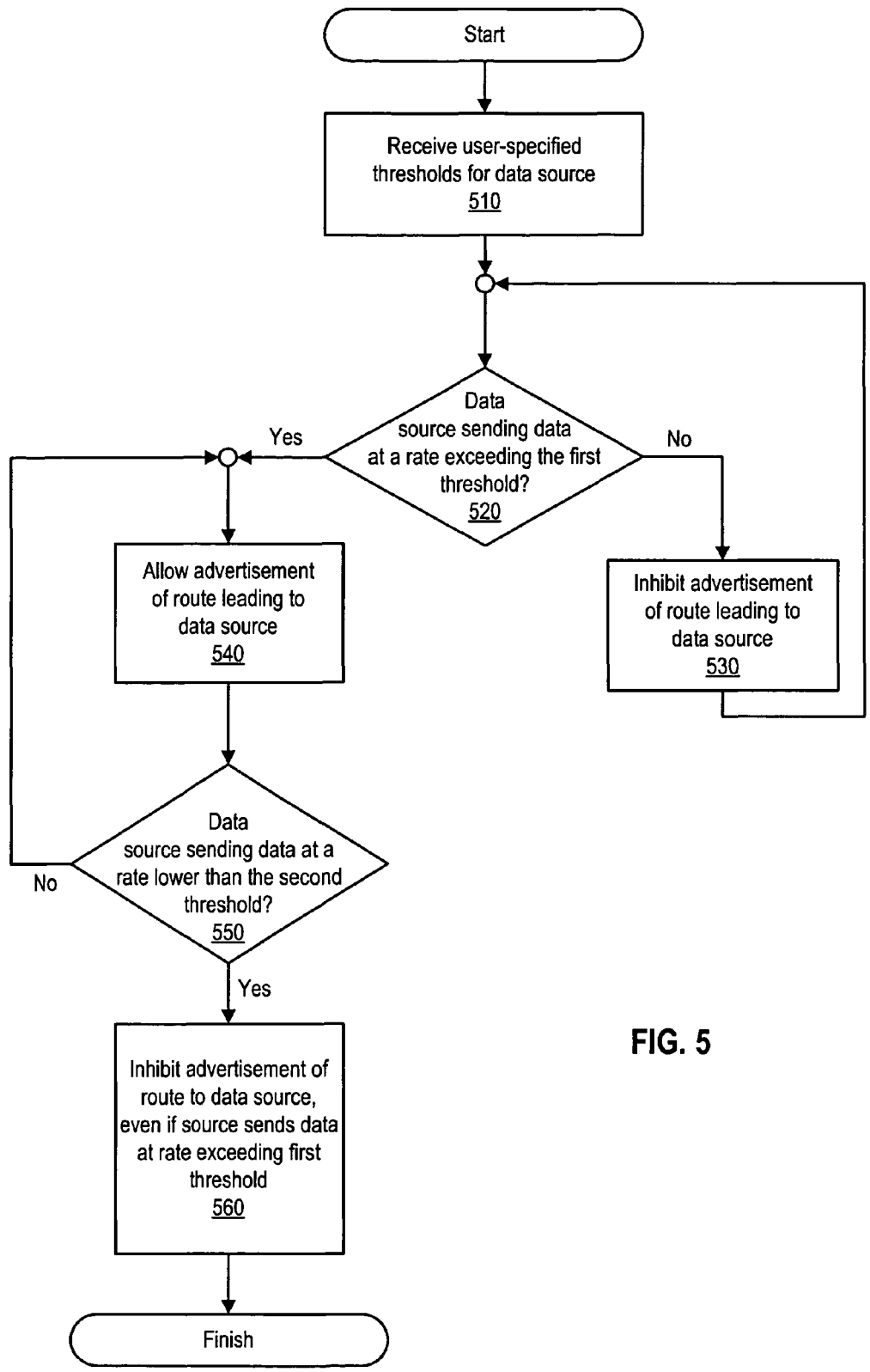
FIG. 5 is a flowchart of one embodiment of a method of performing data driven route advertisement that includes hysteresis.

FIGS. 3, 4, and 5 provide examples of different techniques for performing data driven route advertisement. FIG. 3 is a flowchart of one embodiment of a method of performing data driven route advertisement that simply checks whether any data at all has been sent by the data source. This method can be performed by a network device such as network device 14 of FIG. 2. The method begins with function 310, which involves inhibiting the advertisement of a route that leads to a data source. Function 310 can be performed automatically at startup.

Inhibiting the advertisement of the route to the data source involves preventing information identifying the route from being included in any routing table updates, sent from a router, even if the router already stores the information identifying the route in the router's routing table. Thus, while function 310 is being performed, the router will not include information identifying the route in the routing table updates that the router is sending. The router can be inhibited from advertising a route by, for example, updating a status bit associated with the route in the routing table.

At 320, a determination is made as to whether at least one packet has been received from the data source. If no packets have been received from the data source, the router will continue to perform function 310. If one or more packets have been received from the data source, however, the router allows the advertisement of the route to the multicast source. Thus, in response to detecting data sent by the data source, the router will begin to advertise a route to the data source.

FIG. 4 is a flowchart of one embodiment of a method of performing data driven route advertisement based on a user-specified data rate threshold. Like the method of FIG. 3, the method of FIG. 4 can be performed by network devices such as network device 14 of FIG. 2. The method begins at 410, where user input specifying a data rate threshold is received. This user-specified threshold is stored and used to determine whether to allow a route to a particular data source to be advertised.

At 420, a determination is made as to whether the data source is sending data at a rate that exceeds the user-specified data rate threshold. If the data source is sending data at a rate that exceeds the user-specified data rate threshold, advertisement of a route to the data source is allowed, as shown at 430. Otherwise, advertisement of the route is inhibited, as indicated at 440. This process can repeat, such that the advertisement of the route will cease to be allowed if the data source stops sending data at a rate that exceeds the user-specified data rate threshold.

It is noted that a network device can perform data driven route advertisement for several different routes to different data sources at substantially the same time. In one embodiment, the same data rate threshold can be used to control advertisement of routes to several different data sources. For example, a first route to a first data source can be advertised in response to detecting that the first data source is sending data at a rate exceeding the threshold; at the same time, a second route to a second data source is not advertised in response to detecting that the second data source is not sending data at a rate exceeding the threshold. In other embodiments, a different data rate threshold can be specified for each of several different data sources, and advertisement of routes to each of the data sources is controlled based on the appropriate one of the data rate thresholds.

FIG. 5 is a flowchart of one embodiment of a method of performing data driven route advertisement that includes hysteresis. In the method of FIG. 5, more than one data rate threshold is used to control the advertisement of a route to a particular data source. In this method, several user-specified thresholds are received via a user interface, as indicated at 510. One threshold is the threshold above which advertisement of a route to a particular data source will be allowed. Another threshold is the threshold below which advertisement of a route to a particular data source will be prohibited. As will be appreciated, the second threshold is at least somewhat lower than the first threshold.

More than two thresholds can be received at 510. For example, a first threshold can indicate the threshold above which advertisement of a route to a data source can begin after startup of the network device. A second threshold is the threshold below which advertisement of the route to the data source will cease. A third threshold is the threshold above which advertisement of the route can begin, after advertisement of the route to the data source has ended due to the data source temporarily ceasing to send data at a rate that exceeds the second threshold.

In addition to specifying each threshold as a rate per unit time, each threshold can also include a duration component. For example, one threshold can indicate both a data rate and a length of time that the data rate should be exceeded. By specifying a duration, no change in advertisement controls for a particular data source will occur until the specified data rate has been exceeded (or has exceeded the rate at which the data source is sending data) for the specified length in time. This can prevent changes (from advertising to non-advertising, or from non-advertising to advertising) due to transient spikes or drops in traffic generated by the data source.

Initially (e.g., when the network device starts up and/or in response to receiving a user-specified threshold for the data stream sourced by the data source), advertisement of the route to the data source is inhibited. At 520, a determination is made as to whether the data source is sending data at a rate that exceeds a first threshold. If the data source is sending data at a rate that exceeds the first threshold, advertisement of the route to the data source is allowed, as indicated at 540. Otherwise, advertisement of the route to the data source continues to be inhibited, as shown at 530.

If advertisement of the route to the data source has been allowed, traffic from the data source is monitored against a second threshold. This second threshold is lower than the first threshold. At 550, a determination is made as to whether the data source is sending data at a rate that is lower than the second threshold. If the data source is sending data at a rate that exceeds the second threshold, advertisement of the route to the data source continues to be allowed. If the data source is sending data at a rate that is less than the second threshold, however, advertisement of the route to the data source is inhibited, as indicated at 560.

Additionally, in some embodiments, the network device generates an error indication (e.g., by sending an email, lighting up an LED (Light Emitting Diode), creating an entry in an error log, or the like) in response to re-inhibiting advertisement of the route to the data source at 560. This error indication alerts an administrator to the fact that the data source has stopped sending data at the specified rate. In some embodiments, the network device requires that the administrator take some action (e.g., by resetting the network device or clearing the error indication) before the network device will again allow advertisement of the route to the data source. This prevents the network device from continuing to advertise a route to a data source that is either impaired or "flapping." A flapping device is a device that is experiencing an error condition that causes the data source to cycle between an impaired and a non-impaired state. For example, a flapping data source could be experiencing an error that causes that data source to alternate between sending a non-blank video stream and sending a blank video stream. Since the flapping data source is not sending a reliably non-blank video stream, it may not be desirable to advertise the route to the flapping data source, especially if other, non-flapping sources of the same video stream are available.

By using two thresholds to control advertisement of the route to the data source, the method of FIG. 5 provides hysteresis, or control that is based at least in part on prior behavior. The thresholds can be selected so that route advertisement will not toggle on and off quickly in response to transient changes in the rate at which the data source is sending data.

It is noted that the methods of FIGS. 3, 4, and 5 are provided as examples. Other embodiments are possible. For example, in another embodiment, advertisement of a route to a data source can be based on a packet rate (as opposed to a data rate) threshold. Similarly, such a packet-rate-based technique can use several thresholds in order to implement hysteresis. Additionally, while the above examples describe controlling advertisement of a route to a data source based on whether the data source is sending data at a rate that exceeds a user-specified threshold, other embodiments can implement default thresholds. Similarly, other embodiments can use different comparisons (e.g., whether the data source is sending data at a rate that is greater than or equal to the user-specified threshold).

Figure 6:
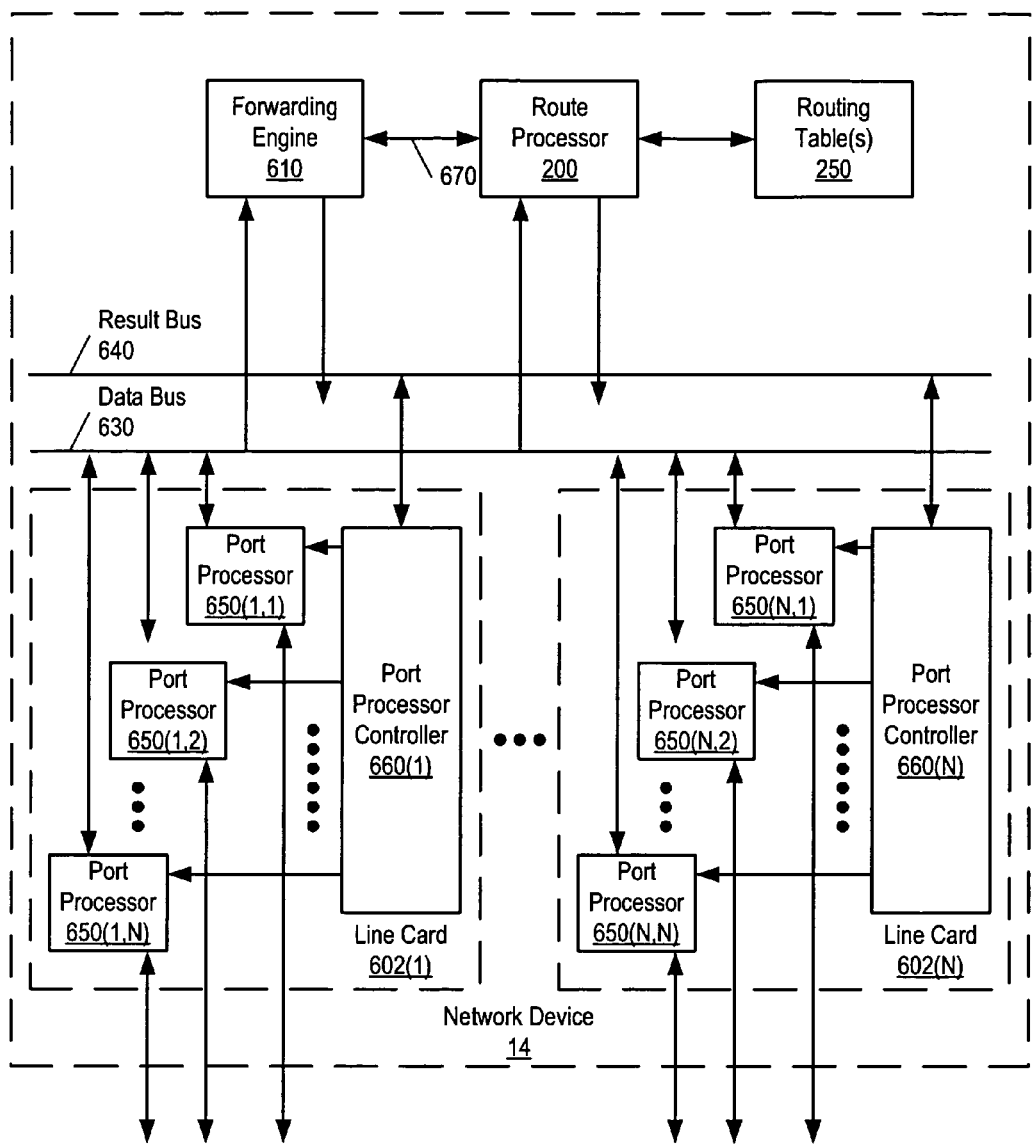
FIG. 6 is a block diagram of a router that is configured to perform data driven route advertisement, according to one embodiment of the present invention.

FIG. 6 is a block diagram of a network device 14 (e.g., one of network devices 14(1)-14(4) of FIG. 1). In this depiction, network device 14 includes a number of line cards (line cards 602(1)-602(N)) that are communicatively coupled to a forwarding engine 610 and a route processor 200 (e.g., such as illustrated in FIG. 2) via a data bus 630 and a result bus 640. Line cards 602(1)-602(N) include a number of port processors 650(1,1)-650(N,N) which are controlled by port processor controllers 660(1)-660(N). It will also be noted that forwarding engine 610 and route processor 200 are not only coupled to one another via data bus 630 and result bus 640, but are also communicatively coupled to one another by a communications link 670. It is noted that in alternative embodiments, each line card can include a forwarding engine.

When a packet is received, the packet is identified and analyzed by a network device such as network device 14 in the following manner, according to embodiments of the present invention. Upon receipt, a packet (or some or all of its control information) is sent from the one of port processors 650(1,1)-650(N,N) at which the packet was received to one or more of those devices coupled to data bus 630 (e.g., others of port processors 650(1,1)-650(N,N), forwarding engine 610 and/or route processor 200). Handling of the packet can be determined, for example, by forwarding engine 610. For example, forwarding engine 610 may determine that the packet should be forwarded to one or more of port processors 650(1,1)-650(N,N). This can be accomplished by indicating to corresponding one(s) of port processor controllers 660(1)-660(N) that the copy of the packet held in the given one(s) of port processors 650(1,1)-650(N,N) should be forwarded to the appropriate one of port processors 650(1,1)-650(N,N).

Figure 6A:
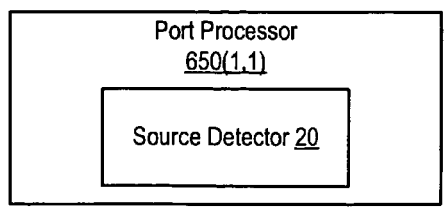
FIG. 6A is a block diagram, illustrating how a source detector can be included in a port processor, in one embodiment of the present invention.

In the example of FIG. 6, a source detector (e.g., source detector 20 of FIG. 2) can be implemented in one or more of port processors 650(1,1)-650(N,N), port processor controllers 660(1)-660(N), or route processor 200. For example, FIG. 6A illustrates how source detector 20 can be included in port processor 650(1,1). The source detector can monitor traffic that enters network device 14 via one or more port processors 650(1,1)-650(N,N) for packets being sent from a particular source. Based on the monitored traffic, the source detector can determine whether a route that leads to the data source from network device 14 should be advertised. The source detector can then communicate with route processor 200 in order to control advertisement of the route. As noted above, route processor 200 can implement functionality that maintains routing table 250 as well as functionality that generates routing advertisements. In response to the source detector allowing advertisement of the route, route processor 200 can generate routing advertisements that include information identifying the route and send the routing advertisements to other network devices via port processors 650(1,1)-650(N,N).

Figure 7:
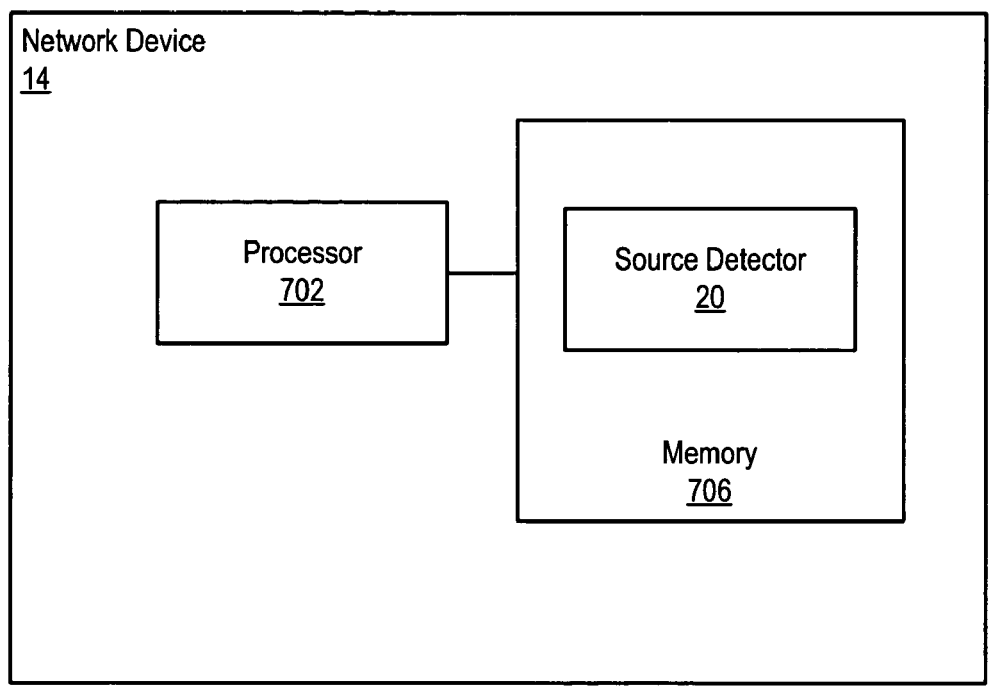
FIG. 7 is a block diagram of a router, indicating how a source detector that is used in performing data drive route advertisement can be implemented in software, according to one embodiment of the present invention.

FIG. 7 illustrates a block diagram of a network device 14, which illustrates how source detector 20 can be implemented in software. It is noted that other modules, such as route advertisement module 210 and routing table update module 220 of FIG. 2, can similarly be implemented in software. As illustrated, network device 14 includes one or more processors 702 (e.g., microprocessors, PLDs (Programmable Logic Devices), or ASICs (Application Specific Integrated Circuits)) configured to execute program instructions stored in memory 706. Memory 706 can include various types of RAM (Random Access Memory), ROM (Read Only Memory), Flash memory, MEMS (Micro Electro-Mechanical Systems) memory, and the like. Processor 702 and memory 706 can be included in a port processor (e.g., port processors 650(1,1)-650(N,N) of FIG. 6), a port processor controller (e.g., port processor controllers 660(1)-660(N)), or a route processor (e.g., route processor 200 of FIGS. 2 and 6). Processor 702 and memory 706 are coupled to send and receive data and control signals by a bus or other interconnect.

In this example, program instructions executable to implement source detector 20 are stored in memory 706. The program instructions and data implementing source detector 20 can be stored on various computer readable media such as memory 706. In some embodiments, source detector 20 software is stored on a computer readable medium such as a CD (Compact Disc), DVD (Digital Versatile Disc), hard disk, optical disk, tape device, floppy disk, and the like). In order to be executed by processor 702, the instructions and data implementing source detector 20 are loaded into memory 706 from the other computer readable medium. The instructions and/or data implementing source detector 20 can also be transferred to network device 14 for storage in memory 706 via a network such as the Internet or upon a carrier medium. In some embodiments, a computer readable medium is a carrier medium such as a network and/or a wireless link upon which signals such as electrical, electromagnetic, or digital signals, on which the data and instructions implementing source detector 20 are encoded, are conveyed.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   inhibiting advertisement of a route while continuing to advertise other routes, wherein
the inhibiting is performed in response to determining that a data source is not sending data at a rate that exceeds a user-specified threshold,
the route is an existing communications pathway via which packets can be sent to the data source,
the data source is one of a set of redundant data sources, wherein the data source shares an address with another data source of the set of redundant data sources,
the route is one of a plurality of routes to the set of redundant data sources,
information identifying the route is stored in a routing table while the advertisement of that route is inhibited, and
the inhibiting prevents inclusion of the information identifying the route in a routing table update;
detecting data sent by the data source, wherein the detecting is performed subsequently to the inhibiting; and
allowing the advertisement of the route, in response to the data being detected.

2. The method of claim 1, wherein
the data source is a multicast source, and
the address is an anycast address, wherein a packet sent to the anycast address traverses a minimum-length route of multiple routes associated with the address.

3. The method of claim 2, further comprising:
receiving the user-specified threshold;
determining whether the multicast source is sending data at a rate exceeding the user-specified threshold, wherein the determining comprises the detecting the data;
allowing the advertisement of the route, in response to determining that the multicast source is sending data at the rate exceeding the user-specified threshold.

4. The method of claim 3, further comprising:
receiving a second user-specified threshold, wherein the second threshold is lower than the user-specified threshold;
determining whether the multicast source is sending data at a rate that is lower than the second user-specified threshold, subsequent to the allowing the advertisement of the route; and
inhibiting advertisement of the route, in response to determining that the multicast source is sending data at the rate that is lower than the second user-specified threshold.

5. The method of claim 3, further comprising:
detecting that the multicast source is impaired, subsequent to allowing advertisement of the route; and
inhibiting advertisement of the route, in response to the detecting.

6. The method of claim 5, further comprising:
alerting an administrator that the multicast source is impaired, in response to the detecting; and
continuing to inhibit advertisement of the route until user input corresponding to the multicast source is received.

7. The method of claim 1, wherein at least one of the other routes is a communications pathway to a second data source, and wherein the data source and the second data source are configured to send duplicate data streams to the same multicast group address.

8. A system comprising:
a source detector configured to detect data sent by a data source; and
a route advertiser configured to advertise a route, in response to the source detector detecting the data, wherein
the route is an existing communications pathway via which packets can be sent to the data source,
the route advertiser is configured to inhibit advertisement of the route while continuing to advertise other routes prior to the source detector detecting the data, wherein the inhibiting is performed in response to determining that the data source is not sending data at a rate that exceeds a user-specified threshold,
the data source is one of a set of redundant data sources,
the route is one of a plurality of routes to the set of redundant data sources,
wherein
the data source shares an address with another data source of the set of redundant data sources,
information identifying the route is stored in a routing table while the advertisement of that route is inhibited,
the routing table is maintained by a network device, and
inhibiting advertisement of the route prevents inclusion of the information identifying the route in a routing table update.

9. The system of claim 8, wherein the data source is a multicast source, and
the address is an anycast address, wherein a packet sent to the anycast address traverses a minimum-length route of multiple routes associated with the address.

10. The system of claim 9, wherein
the source detector is configured to receive a user-specified threshold and to detect whether the multicast source is sending data at a rate exceeding a user-specified threshold.

11. The system of claim 10, wherein the route advertiser is configured to:
allow the advertisement of the route, in response to the source detector detecting that the multicast source is sending data at the rate exceeding the user-specified threshold.

12. The system of claim 11, wherein
the source detector is further configured to:
receive a second user-specified threshold, wherein the second threshold is lower than the user-specified threshold; and
detect whether the multicast source is sending data at a rate that is lower than the second user-specified threshold, subsequent to route advertiser allowing the advertisement of the route; and
the route advertiser is configured to:
inhibit advertisement of the route, in response to the source detector detecting that the multicast source is sending data at the rate that is lower than the second user-specified threshold.

13. The system of claim 11, wherein
the source detector is further configured to detect that the multicast source is impaired, subsequent to the route advertiser allowing advertisement of the route; and
the route advertiser is configured to inhibit advertisement of the route, in response to the source detector detecting that the multicast source is impaired.

14. The system of claim 11, wherein
the source detector is configured to alert an administrator that the multicast source is impaired; and
the route advertiser is configured to inhibit advertisement of the route until user input corresponding to the multicast source is received.

15. The system of claim 8, wherein at least one of the other routes is a communications pathway to a second data source, and wherein the data source and the second data source are configured to send duplicate data streams to the same multicast group address.

16. A system comprising:
   means for inhibiting advertisement of a route while continuing to advertise other routes, wherein
      the inhibiting is performed in response to determining that a data source is not sending data at a rate that exceeds a user-specified threshold,
      the route is an existing communications pathway via which packets can be sent to a data source,
      the data source is one of a set of redundant data sources, wherein the data source shares an address with another data source of the set of redundant data sources,
      the route is one of a plurality of routes to the set of redundant data sources,
      information identifying the route is stored in a routing table while the advertisement of that route is inhibited, and
      inhibiting advertisement of the route prevents inclusion of the information identifying the route in a routing table update;
   means for detecting data sent by the data source, wherein the means for detecting is included in at least one of a network device or a memory; and
   means for allowing the advertisement of the route, in response to the data being detected.

17. The system of claim 16, wherein at least one of the other routes is a communications pathway to a second data source, and wherein the data source and the second data source are configured to send duplicate data streams to the same multicast group address.

* * * * *